J. F. FREELAND.
REIN SUPPORT.
APPLICATION FILED APR. 2, 1909.
945,385.
Patented Jan. 4, 1910.
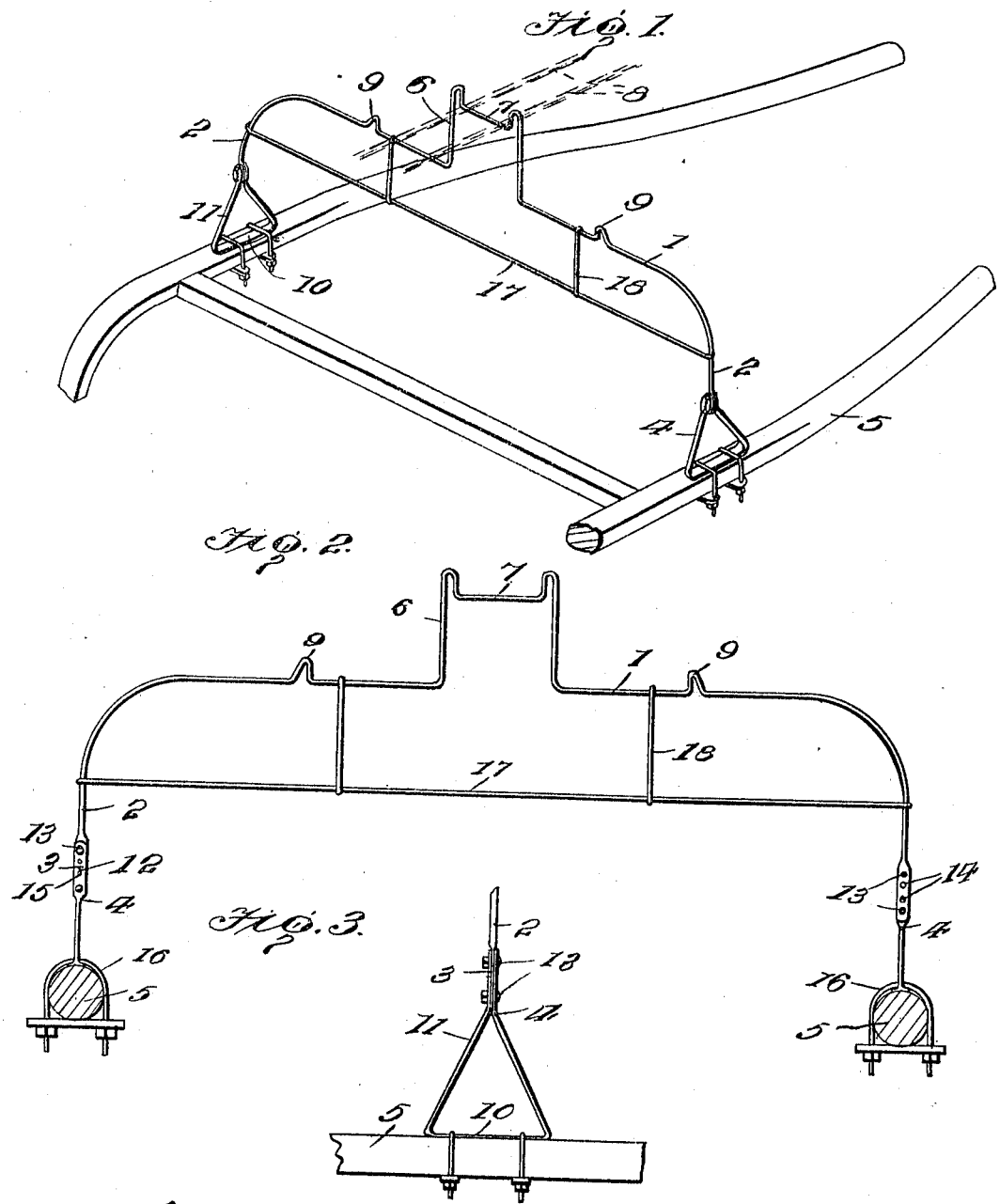

UNITED STATES PATENT OFFICE.

JOHN F. FREELAND, OF BLOOMFIELD, INDIANA.

REIN-SUPPORT.

945,385.  Specification of Letters Patent.  Patented Jan. 4, 1910.

Application filed April 2, 1909. Serial No. 487,572.

*To all whom it may concern:*

Be it known that I, JOHN F. FREELAND, a citizen of the United States, residing at Bloomfield, in the county of Greene and State of Indiana, have invented certain new and useful Improvements in Rein-Supports, of which the following is a specification.

The object of my invention is to provide a rein support which will be light and durable in construction and effectually prevent an animal from interfering with the reins while driving, without limiting or in any wise impeding the movement of the animal.

The invention consists essentially of an elevated support frame constructed of light metal and adapted to bridge the intervening space between the vehicle shafts intermediate of the harnessed position of the animal and the vehicle, and secured to the shafts in an adjustable and detachable manner.

For a full understanding of the invention and the merits thereof and also to acquire a knowledge of the details of construction and the means for effecting the result, reference is to be had to the following description and accompanying drawings, in which:

Figure 1 is a perspective view of the support. Fig. 2 is a front elevation thereof; and Fig. 3 is an enlarged detail view of the support standards.

Corresponding and like parts are referred to in the following description and indicated in all the views of the drawings by the same reference characters.

Referring to the drawings the numeral 1 designates the main frame of the support preferably constructed of light metal and provided with side members 2, the flattened ends 3 of which are adjustably secured within standards 4 located upon the vehicle shafts 5. The said frame is formed intermediate of the side members 2 with an elevated portion 6 in top of which a depression 7 is formed to receive and retain the reins 8. Projections 9 formed on the frame intermediate of the vertical sides of the elevated portion 6 and the side members 2 serve to prevent said reins from sliding off the support when turns are made and also serve to conveniently retain the reins in the proper relative driving position.
The standards 4 are formed with a horizontal base section 10 and side members 11 converging at their upper ends into parallel flattened portions 12 spaced to receive the similarly formed end portions 3 of the side members 2. The said flattened portions 3 of the side members are arranged to extend between the ends 12 of the standards 4 and are adjustably secured thereto by pins 13 extending through openings 14 in the end portion 3 registering with openings 15 in the flattened portions 12.

The bases 10 of the standards are designed to rest upon the upper sides of the shafts, and to this end, each consists of a triangularly bent rod, the upwardly turned ends of said rod at the apex of said triangle being flattened to engage with the flattened ends of the rein support, and being perforated for securing bolts. The base of the triangle is flattened so as to make a good contact with the face of the shaft and also with U-shaped clips 16 which extend over the base, downwardly around the shaft, and are secured at their under sides by tie bars and nuts, as shown.

The support is rigidly braced and strengthened by a horizontal brace rod 17 extending between the side members 2, parallel with the frame 1 and secured to said frame by struts 18.

With the arrangement of the several parts as shown the support is preferably located upon the vehicle shafts intermediate of the harnessed position of the animal and the vehicle body, whereby the reins are elevated and retained in a manner preventing interference on the part of the animal. The reins ordinarily rest within the depression 7 of the elevated portion 6 and when making sharp turns may occupy a position on the frame to either side of the elevated portion 6, determined by the relative angle of the shafts to the vehicle body and are prevented from sliding off the support frame by the projections 9.

The support with slight changes in formation may be used in connection with vehicles wherein two animals are employed and in that instance is preferably secured to the opposite ends of the double tree.

Having thus described the invention, what is claimed as new is:

1. A rein support comprising a frame substantially arched in shape, having downwardly turned ends, said ends being provided with horizontally extending flattened members adapted to contact with the shafts of a vehicle and form standards for the rein holder, that portion of the rein support intermediate of its ends being formed with a central elevated portion having a depression in it for the reception of the reins, those portions of the frame intermediate the central depressed portion and the ends being formed with upward projections between which and the central depressed portion the reins may be received.

2. A rein support consisting of a frame substantially arched in form and provided intermediate of its ends with rein-retaining projections and depressions, the ends of the frame being downwardly turned and formed with flattened extremities and standards whereby the frame may be attached to the shafts of a wagon and longitudinally adjusted therealong, each standard consisting of a triangularly bent rod, the middle of said rod forming the base of said triangle, being flattened, the opposite upwardly turned ends of the rod at the apex of the triangle being spaced from each other and flattened and engaging with the adjacent flattened extremity of the frame, bolts passing through the flattened extremities of the standards and the ends of the frame, and clips adapted to extend around the shaft and over the flattened base of said standard between the upwardly turned sides of the triangle standards to hold it on the shaft.

3. A rein support comprising a metal rod having a general arch shaped form, the ends of said rod being downwardly turned and flattened, the middle of said rod being upwardly bent at separated portions and connected by a depressed bar forming an elevated central rein support, the portions of the rod between the central elevated portion and the downwardly bent extremities being upwardly bent to form opposed ears between which and the centrally elevated portions the reins may be retained, a brace bar extending between the downwardly turned ends and connected to said arch shaped rod and standards for mounting the rein support upon the shafts of a wagon, each consisting of a triangularly bent rod, the ends of said rod at the apex of the triangle being flattened to engage with the flattened ends of the rein support and having bolts passing through said flattened end, the base of each triangular standard being flattened, and U-shaped clips passing around the flattened bases and connecting the same to a shaft.

In testimony whereof I affix my signature in presence of two witnesses.

JOHN F. FREELAND. [L. S.]

Witnesses:
  JOSEPH HOUSUM,
  PETER M. COOK.